United States Patent
Ferreira et al.

(10) Patent No.: US 10,011,529 B2
(45) Date of Patent: Jul. 3, 2018

(54) ULTRA-HIGH PERFORMANCE CONCRETE

(71) Applicant: LAFARGE, Paris (FR)

(72) Inventors: Laurent Ferreira, Saint Quentin Fallavier (FR); Olivier Halin, Saint Quentin Fallavier (FR); Fabien Perez, Saint Quentin Fallavier (FR); Julien Verne, Saint Quentin Fallavier (FR)

(73) Assignee: LAFARGE, Paris (FR)

( * ) Notice: Subject to any disclaimer, the term of this patent is extended or adjusted under 35 U.S.C. 154(b) by 0 days.

(21) Appl. No.: 15/320,184

(22) PCT Filed: Jun. 18, 2015

(86) PCT No.: PCT/EP2015/063683
§ 371 (c)(1),
(2) Date: Dec. 19, 2016

(87) PCT Pub. No.: WO2015/193419
PCT Pub. Date: Dec. 23, 2015

(65) Prior Publication Data
US 2017/0152178 A1     Jun. 1, 2017

(30) Foreign Application Priority Data

Jun. 20, 2014   (FR) ..................... 14 55725

(51) Int. Cl.
| | | |
|---|---|---|
| C04B 24/32 | (2006.01) | |
| C04B 28/04 | (2006.01) | |
| C04B 14/10 | (2006.01) | |
| C04B 18/14 | (2006.01) | |
| C04B 14/04 | (2006.01) | |
| C04B 14/28 | (2006.01) | |
| C04B 7/52 | (2006.01) | |
| C04B 103/32 | (2006.01) | |
| C04B 103/50 | (2006.01) | |
| C04B 103/00 | (2006.01) | |

(52) U.S. Cl.
CPC ............. *C04B 24/32* (2013.01); *C04B 7/527* (2013.01); *C04B 14/04* (2013.01); *C04B 14/106* (2013.01); *C04B 14/28* (2013.01); *C04B 18/146* (2013.01); *C04B 28/04* (2013.01); *C04B 2103/0079* (2013.01); *C04B 2103/32* (2013.01); *C04B 2103/50* (2013.01); *C04B 2201/52* (2013.01)

(58) Field of Classification Search
CPC ....... C04B 24/32; C04B 28/04; C04B 14/106; C04B 14/04; C04B 14/28; C04B 18/146; C04B 7/527; C04B 2103/32; C04B 2103/50; C04B 2103/0079; C04B 2201/52
See application file for complete search history.

(56) References Cited

U.S. PATENT DOCUMENTS

2012/0012034 A1   1/2012   Guynn et al.

FOREIGN PATENT DOCUMENTS

| EP | 0 934 915 A1 | 8/1999 |
| FR | 2 801 049 A1 | 5/2001 |
| FR | 2 837 819 A1 | 10/2003 |
| FR | 2 947 259 A1 | 12/2010 |
| WO | WO 02/18291 A1 | 3/2002 |
| WO | WO 2006/032765 A2 | 3/2006 |
| WO | WO 2006/032786 A2 | 3/2006 |
| WO | WO 2009/111295 A1 | 9/2009 |
| WO | WO 2011/027890 A1 * | 3/2010 |

OTHER PUBLICATIONS

"Feinstzemente," In: Jochen Stark & Bernd Wicht Ed: "Zement Unc Kalk: Der Baustoff Als Werkstoff," Jan. 2000, Birkhäuser Verlag, XP002737015, ISBN: 3-7643-6216-2, pp. 154-159.
International Search Report as issued in International Patent Application No. PCT/EP2015/063683, dated Sep. 16, 2015.
Preliminary Search Report as issued in French Patent Application No. 1455725, dated Mar. 10, 2015.

* cited by examiner

*Primary Examiner* — Anthony J Green
(74) *Attorney, Agent, or Firm* — Pillsbury Winthrop Shaw Pittman LLP

(57) ABSTRACT

A hydraulic composition includes in relative parts by mass with respect to the cement 100 parts of cement the particles of which have a BET specific surface area comprised from 1.20 to 5 m$^2$/g; 32 to 42 parts of water; 5 to 50 parts of a mineral addition A1 the particles of which have a D50 less than or equal to 6 μm and selected from silica fume, metakaolin, slag, pozzolans or mixtures thereof; 90 to 230 parts of sand the particles of which have a D50 greater than or equal to 50 μm and a D90 less than or equal to 3 mm; 0.0001 to 10 parts of a superplasticizer, the active material concentration of which is 15% by mass.

17 Claims, No Drawings

ULTRA-HIGH PERFORMANCE CONCRETE

CROSS-REFERENCE TO RELATED APPLICATIONS

This application is the U.S. National Stage of International Application Serial No. PCT/EP2015/063683, filed Jun. 18, 2015, which in turn claims priority to French Application No. 1455725, filed Jun. 20, 2014. The contents of all of these applications are incorporated herein by reference in their entirety.

The present invention relates to the field of materials for the field of construction, and more particularly to a hydraulic composition allowing an ultra-high performance concrete to be obtained.

Technological progress in recent years in the field of concretes has led to the development of ultra-high performance concretes, particularly in terms of compressive strength. These concrete formulations generally involve the recourse to additional materials other than the cement and aggregate e.g. fibers, organic admixtures or so-called ultra-fine particles generally of smaller size than the cement particles.

The use of these ultra-high performance concretes is made delicate when the question is to produce in one go concrete parts comprising horizontal elements and vertical or inclined elements. For example when the question is to manufacture in a factory a concrete part, the final section of which is U-shaped or L-shaped, it is necessary to separately and horizontally cast the elements of the part to be produced and then to assemble them by adhesively bonding them, by anchoring or screwing them together in order to obtain the U- or L-section. This has the drawback of multiplying the manufacturing operations for these parts, the manufacturing of the part per se becomes complex, increasing the possibilities of errors and reducing the robustness of the parts.

Also there exists a need relating to ultra-high performance concrete formulations with which concrete parts may be made in a single step, regardless of their shapes or their sections without resorting to an assembling step.

The problem that the invention sets out to solve is therefore that of providing novel formulations for non-self-levelling, ultra-high performance concretes which are able to remain in place when applied to an inclined or vertical plane.

The concrete compositions of the invention have the following advantages:
- they may be applied by projection, in particular with a projection gun or by spraying with a projecting lance;
- they may be used in methods for manufacturing concrete parts by calendering;
- they may be used in repairing or rehabilitating concrete structures existing on inclined or vertical surfaces, for example a pier or bridge slab, or an unloading dock of a harbor;
- they have compressive mechanical strengths at 28 days generally comprised from 90 to 150 MPa, or even more;
- they may contain fibers giving them additional interesting properties, like ductility;
- they have a stress threshold greater than 50 Pa measured at a shear gradient of $0.1\ s^{-}$, preferably greater than 100 Pa.

The present invention relates to a hydraulic composition comprising in relative parts by mass with respect to the cement:

- 100 parts of cement the particles of which have a BET specific surface area comprised from 1.20 to 5 $m^2/g$;
- 32 to 42 parts of water;
- 5 to 50 parts of a mineral addition A1 the particles of which have a D50 less than or equal to 6 μm and selected from silica fume, metakaolin, slag, pozzolans or mixtures thereof;
- 90 to 230 parts of sand the particles of which have a D50 greater than or equal to 50 μm and a D90 less than or equal to 3 mm;
- 0.0001 to 10 parts of a superplasticizer, the active material concentration of which is 15 by mass.

In the remaining text, the expression "hydraulic composition of the invention" designates the hydraulic composition described above and its variants No 1 and No 2 described below.

According to variant No 1, the hydraulic composition, in relative parts by mass with respect to the cement, comprises:
- 100 parts of cement the particles of which have a BET specific surface area comprised from 1.20 to 1.7 $m^2/g$;
- 38 to 42 parts of water;
- 8 to 20 parts of a mineral addition A1 the particles of which have a D50 less than or equal to 6 μm and selected from silica fume, metakaolin, slag, pozzolans or mixtures thereof;
- 90 to 180 parts of sand the particles of which have a D50 comprised from 100 μm to 400 μm and a D90 less than or equal to 800 μm;
- 0.0001 to 10 parts of a superplasticizer, the active material concentration of which is 15 by mass.

According to variant No 2 the hydraulic composition, in relative parts by mass with respect to the cement, comprises:
- 100 parts of cement the particles of which have a BET specific surface area comprised from 1.20 to 5 $m^2/g$;
- 32 to 42 parts of water;
- 5 to 50 parts of a mineral addition A1 the particles of which have a D50 less than or equal to 6 μm and selected from silica fume, metakaolin, slag, pozzolans or mixtures thereof;
- 90 to 230 parts of sand the particles of which have a D50 greater than or equal to 50 μm and a D90 less than or equal to 3 mm;
- 0.0001 to 10 parts of a superplasticizer the active material concentration of which is 15% by mass; and
- 0.001 to 2 parts of viscosity-modifying agent.

A hydraulic binder is a material that sets and hardens via hydration e.g. a cement.

The setting is generally the passing to the solid state of a hydraulic binder by hydration reaction. The setting is generally followed by a hardening period.

The hardening is generally the acquisition of mechanical strengths of a hydraulic binder. The hardening generally takes place after the end of the setting.

The hydraulic composition of the invention includes both compositions in the fresh state and compositions in the hardened state e.g. a cement slurry, mortar or concrete.

The cements suitable for use in the present invention are generally Portland cements for which the BET surface area is comprised from 1.20 to 5 $m^2/g$.

The preferred Portland cements are those defined in European standard NF EN 197-1 of February 2001, more preferably they are CEM I cements.

Preferably, the cement is a cement the particles of which have a BET specific surface area comprised from 1.20 to 3 $m^2/g$, more preferably comprised from 1.20 to 2.2, $m^2/g$ and further preferably comprised from 1.20 to 1.7 $m^2/g$.

Preferably, the cement is a cement the particles of which have a D10 comprised from 1 μm to 8 μm, more preferably from 1 μm to 5 μm, and further preferably from 1 μm to 2 μm.

Preferably, the cement is a cement the particles of which have a D50 comprised from 4 μm to 10 μm, more preferably from 5 μm to 9 μm.

Preferably, the cement is a cement the particles of which have a D90 comprised from 8 μm to 25 μm, more preferably from 10 μm to 20 μm.

Preferably, the cement is a cement for which the Blaine specific surface area is greater than or equal to 6050 $cm^2/g$, preferably greater than or equal to 6100 $cm^2/g$.

The Portland cement able to be used in the present invention may be milled and/or separated (using a dynamic separator) to obtain a cement having a Blaine specific surface area greater than or equal to 6050 $cm^2/g$. This cement may be qualified ultra-fine. The cement may be milled using 2 methods for example.

According to the first method, the cement or clinker may be ground to a Blaine specific surface area of 6050 to 9000 $cm^2/g$. A second or third generation, high-efficiency separator or very high-efficiency separator may be used at this first step to separate the cement having the desired fineness from the cement not having the desired fineness. The latter is then returned to the mill.

According to a second method, a Portland cement may be passed through a very high-efficiency separator, known as a very high fineness separator, to separate the cement particles having a Blaine specific surface area greater than or equal to the target fineness (the target fineness being greater than 6050 $cm^2/g$) from the cement particles having a Blaine specific surface area lower than the target fineness. The cement particles having a Blaine specific surface area greater than or equal to the target fineness may be used as such. The cement particles having a Blaine specific surface area lower than the target fineness may be set aside or milled separately until the desired Blaine specific surface area is obtained. The mills that may be used in both methods are for example ball mills, vertical mills, roller presses, horizontal mills (e.g. of Horomill© type) or an agitated vertical mill (e.g. of Tower Mill type).

Preferably, the hydraulic composition of the invention comprises from 33 to 42 parts of water, more preferably from 35 to 42 parts water, further preferably from 38 to 42 parts water expressed in relative parts by mass with respect to the cement.

Preferably, the hydraulic composition of the invention comprises from 6 to 40 parts of A1, more preferably from 7 to 30 parts of A1, further preferably from 8 to 20 parts of A1, expressed in relative parts by mass with respect to the cement.

Preferably, A1 is an addition the particles of which have a D50 less than or equal to 6 μm, preferably less than or equal 2 μm.

Preferably, the hydraulic composition of the invention comprises from 90 to 210 parts of sand, more preferably from 90 to 180 parts of sand expressed in relative parts by mass with respect to the cement.

Preferably, the hydraulic composition of the invention comprises sand the particles of which have a D10 comprised from 150 μm to 400 μm.

Preferably, the hydraulic composition of the invention comprises sand the particles of which have a D50 comprised from 100 to 500 μm, more preferably comprised from 100 to 400 μm.

Preferably, the hydraulic composition of the invention comprises sand the particles of which have a D90 less than or equal 2 mm, more preferably a D90 comprised from 200 μm to 1 mm, further preferably a D90 comprised from 200 μm to 600 μm.

Preferably, the sand of the hydraulic composition of the invention is a siliceous sand, a calcined or non-calcined bauxite sand, a silica-calcareous sand or mixtures thereof.

Preferably the hydraulic composition of the invention further comprises from 0 to 300 parts of a mineral addition A2, differing from A1, the particles of which have a D50 comprised from 1 μm to 50 μm, expressed in relative parts by mass with respect to the cement.

Preferably, A2 has no pozzolanic activity. By pozzolanic activity in the meaning of the invention is meant a material capable of forming a compound having hydraulic properties when mixed at ordinary temperature of 20° C. with lime or a lime-releasing material. Therefore, in the meaning of the invention, by a material not having pozzolanic activity is meant a material not capable of forming a compound having hydraulic properties when mixed at an ordinary temperature of 20° C. with lime or a lime-releasing material.

For example, materials not having pozzolanic activity are materials containing calcium carbonate (e.g. ground or precipitated calcium carbonate), preferably ground calcium carbonate. The ground calcium carbonate may be Durcal® 1 for example (OMYA, France). Materials not having pozzolanic activity may be ground quartz e.g. C6 which is a substantially non-pozzolanic silica filler material supplied by Sibelco, France. The preferred BET specific surface area (determined using known methods described below) of ground calcium carbonate or quartz is 2-10 $m^2/g$, generally less than 8 $m^2/g$, for example 4 to 7 $m^2/g$, preferably less than about 6 $m^2/g$. Precipitated calcium carbonate is also suitable as material not having pozzolanic activity. The individual particles generally have a size (called primary size) in the order of 20 nm. The individual particles agglomerate to aggregates having a size (called secondary size) from 0.1 to 1 μm. The aggregates having a (secondary) size from 0.1 to 1 μm may themselves form aggregates of size (called ternary size) larger than 1 μm.

A single material not having pozzolanic activity, or a mixture of materials not having pozzolanic activity may be used in the hydraulic composition of the invention, for example ground calcium carbonate, ground quartz or precipitated calcium carbonate or a mixture thereof.

The mineral addition A2 is generally a finely divided mineral material used in hydraulic compositions (e.g. concrete) or hydraulic binders (e.g. cement) to improve certain properties or to impart particular properties thereto. For example, the mineral additions A2 are calcined shales (for example as defined in the NF EN 197-1 standard, paragraph 5.2.5), mineral additions comprising calcium carbonate, e.g. limestone (for example as defined in the NF EN 197-1 standard, paragraph 5.2.6), mineral additions comprising silica, e.g. siliceous fines or mixtures thereof.

Preferably the mineral addition A2 is a siliceous filler.

Preferably, the hydraulic composition of the invention further comprises from 0 to 10 parts of anhydrous calcium sulfate expressed in relative parts by mass with respect to the cement.

Anhydrous calcium sulfate may be found in the natural state. It is also possible to use an anhydrous calcium sulfate which is a by-product of certain industrial processes.

Preferably, when the fineness of the cement increases, it is also possible to increase the amount of anhydrous calcium sulfate in order to maintain equivalent mechanical strengths.

One skilled in the art will know from his/her knowledge how to optimize the amount of anhydrous calcium sulfate by using known methods. This optimization is a function of the fineness of the cement particles. For example, one skilled in the art could add 2.5 parts of anhydrous calcium sulfate for a cement the particles of which have a BET specific surface area of 1.7 $m^2/g$, expressed in relative parts by mass with respect to the cement. According to another example, one skilled in the art could add 4.5 parts of anhydrous calcium sulfate for a cement the particles of which have a BET specific surface area of 1.85 $m^2/g$, expressed in relative parts by mass with respect to the cement.

Preferably, the hydraulic composition of the invention further comprises mineral fibers (e.g. glass, basalt), organic fibers, metal fibers (e.g. steel) or a mixture thereof.

The organic fibers may notably be selected from polyvinyl alcohol (PVA) fibers, poly-acrylonitrile (PAN) fibers, high density polyethylene (HDPE) fibers, polyamide or polyimide fibers, polypropylene fibers, aramid fibers or carbon fibers. Mixtures of these fibers may also be used.

These organic fibers may appear as an object either consisting of single strand or multiple strands, the diameter of the object ranging from 25 microns to 800 microns. The individual length of the organic fibers is preferably comprised between 10 and 50 mm.

The recourse to mixtures of fibers having different characteristics allows the properties of the concrete to be adapted to the desired characteristics.

Preferably, the hydraulic composition of the invention further comprises 0.001 to 1.5 parts of viscosity-modifying agent expressed in relative parts by mass with respect to the cement.

The term "viscosity-modifying agent" such as used in the present invention and accompanying claims is to be construed as including viscosifying agents, thickeners, for agents for modifying the flow limit. It is a water-soluble product which increases the viscosity of the medium to which it is added.

Preferably, the viscosity-modifying agent of the hydraulic composition of the invention is selected among:
  polymers of natural origin: starch, plant proteins, alginate, welan gum and all other natural gums (guar gum, xanthan gum, gum Arabic, carob flour, carrageenan, diutan);
  semi-synthetic polymers such as starch derivatives, cellulose ethers such as methylcellulose, ethylcellulose, hydroxymethylcellulose, hydroxypropylcellulose, hydroxyethyl methylcellulose (HEMC), hydroxypropyl methylcellulose (HPMC), hydroxyethyl cellulose (HEC) and carboxymethyl cellulose (CMC);
  synthetic polymers, mainly chiefly latex, polyethers (polyethylene glycol), polyacrylamides, and those that are vinyl based (polyvinyl alcohol).

A mixture of these agents may be used.

Preferably, the hydraulic composition of the invention further comprises from 0 to 0.5 parts of anti-foaming agent expressed in relative parts by mass with respect to the cement.

According to one variant, the hydraulic composition of the invention may further comprise admixtures, for example those described in standards EN 934-2, EN 934-3 or EN 934-4.

This may be admixture for hydraulic composition e.g. accelerator, air entrainer, retarder, clay inerting agent, plasticizer and/or superplasticizer. Clay inerting agents are compounds which allow a reduction in or prevent the harmful effects of clays on the properties of hydraulic binders. Clay inerting agents include those described in WO 2006/032785 and WO 2006/032786.

The hydraulic composition of the invention may further comprise an activating agent to facilitate hydration reactions of glassy materials. Such agents comprise sodium and/or calcium salts. The hydraulic composition of the invention comprises from 0.0001 to 10 parts of a superplasticizer the active material concentration of which is 15% by mass. Preferably, this superplasticizer is in liquid form.

Preferably, the hydraulic composition of the invention comprises 0.1 to 10 parts of a superplasticizer the active material concentration of which is 15% by mass. More preferably, the hydraulic composition of the invention comprises from 0.2 to 5 parts of a superplasticizer the active material concentration of which is 15% by mass.

In particular, it is useful to include a super-plasticizer of polycarboxylate type.

The term of "superplasticizer" as used in the present description and in the claims which accompany it is to be understood as including both water reducing agents and superplasticizers as described in the book entitled "*Concrete Admixtures Handbook, Properties Science and Technology*", V. S. Ramachandran, Noyes Publications, 1984.

A water reducing agent is defined as an admixture which typically reduces the amount of mixing water by 10 to 15% typically of a concrete for a given workability. The water reducing agents include, for example lignosulfonates, hydroxycarboxylic acids, carbohydrates and other specialized organic compounds, e.g. glycerol, polyvinyl alcohol, sodium alunnino-methyl-siliconate, sulfanilic acid and casein.

The superplasticizers belong to a new class of water reducing agents, chemically different from normal water reducing agents and able to reduce the amounts of water by about 30%. Superplasticizers have been globally classified in four groups: sulfonated condensates of naphthalene formaldehyde (SNF) (generally a sodium salt); sulfonate condensates of melamine formaldehyde (SMF); modified lignosulfonates (MLS); and others. More recent superplasticizers include polycarboxylic compounds such as polycarboxylates, for example polyacrylates. A superplasticizer is preferably a new generation superplasticizer, e.g. a copolymer containing a polyethylene glycol as a grafted chain and carboxylic functions in the main chain like a polycarboxylic ether. Sodium polycarboxylates-polysulfonates and sodium polyacrylates may also be used. The derivatives of phosphonic acid may also be used. The required amount of super-plasticizer generally depends on the reactivity of the cement. The lower the reactivity, the smaller is the required amount of superplasticizer. In order to reduce the total amount of alkaline salts, the superplasticizer may be used as a calcium salt rather than as a sodium salt.

The present invention also relates to a method for producing a hydraulic composition according to the present invention wherein the cement, additions, sand, water and superplasticizer are mixed optionally with the other compounds described above. The mixing of the hydraulic composition may be conducted using known methods for example.

The hydraulic composition of the invention may be used directly in the fresh state at the work site and applied to the wall to be restored, or at a precast factory, or used as a coating on a solid support.

The present invention also relates to a method for manufacturing an object for the field of construction comprising the following steps:
  (i) preparing a hydraulic composition according to the invention;
  (ii) applying the composition prepared at step (i) to a support.

Preferably, the method of the invention to manufacture an object further comprises a mould release step (iii) after hardening of the hydraulic composition, in particular if the support at step (ii) is a mould.

Preferably, the method of the invention to manufacture an object further comprises a step to pump the hydraulic composition after step (i).

Preferably, according to the method of the invention to manufacture an object, the support at step (i) may be a mould, a wall, a partition or a floor.

Preferably, according to the method of the invention to manufacture an object, the support at step (ii) is a mould, a wall, a partition or a floor. It is also possible to envisage the fixing of reinforcement elements to the support and the full or partial embedding of these elements when applying the hydraulic composition of the invention. These reinforcing elements may be in mineral material (glass, basalt), in organic material (e.g. the organic material described above for organic fibers), in metal material (steel) or mixture thereof. For example, it may be a steel mesh or reinforcing bar in glass fiber.

Preferably, according to the method of the invention to manufacture an object, step (ii) is performed by projecting the hydraulic composition described above, in particular the hydraulic composition comprising in relative parts by mass with respect to the cement:

100 parts of cement the particles of which have a BET specific surface area comprised from 1.20 to 5 $m^2/g$;
32 to 42 parts of water;
5 to 50 parts of a mineral addition A1 the particles of which have a D50 less than or equal to 6 μm and selected from silica fume, metakaolin, slag, pozzolans or mixtures thereof;
90 to 230 parts of sand the particles of which have a D50 greater than or equal to 50 μm and a D90 less than or equal to 3 mm;
0.0001 to 10 parts of a superplasticizer the active material concentration of which is 15% by mass.

It may also be envisaged to spray the hydraulic composition by providing pneumatic, mechanical energy e.g. under pressure using a piston.

Preferably, according to the method of the invention to manufacture an object, step (ii) is performed by spraying variant No1 of the hydraulic composition of the invention. It is possible to envisage the continuous spraying of compressed air onto the hydraulic composition.

Preferably, according to the method of the invention to manufacture an object, step (ii) is performed by casting or calendering variant No 2 of the hydraulic composition of the invention.

Preferably, according to the method of the invention to manufacture an object, the projection step (ii) may be conducted using:

a positive displacement pump e.g. a piston pump, membrane pump, gear pump, vane pump, eccentric screw pump; or
a dynamic pump e.g. a centrifugal pump, vortex pump.

According to one variant of the method of the invention to manufacture an object, it is possible after step (ii) to fix a reinforcement in the composition in the fresh state and then to repeat step (ii).

According to one variant of the method of the invention to manufacture an object, it is possible to spray the above-mentioned mineral, organic or metal fibers, independently of the projection of the hydraulic composition of the invention. This projection of fibers may take place simultaneously or after step (ii).

Preferably the method of the invention to manufacture an object further comprises a heat treatment step.

The present invention also relates to an object formed for the field of construction, comprising the hydraulic composition of the invention.

The hydraulic composition of the invention may be formed so that, after hydration and hardening, a formed object is produced for the field of construction. The invention also relates to said formed object which comprises the hydraulic binder of the present invention or the hydraulic composition of the present invention. The objects formed for the field of construction include for example a floor, screed, foundation, wall, partition wall, ceiling, beam, worktop, pillar, bridge pile, masonry block, piping, post, stair, panel, cornice, mould, roadwork element (e.g. pavement kerb), roof tile, surfacing (e.g. for roadway or wall), an element contributing to an insulating system.

The present invention also relates to a hydraulic binder comprising the materials of the hydraulic composition of the invention, excepting:
water; and
superplasticizer when it is liquid.

In the present description, and the accompanying claims, the percentages are expressed by mass unless specified otherwise.

BET Specific Surface Area Measurement Method

The specific surface area of the various powders is measured as follows. A powder sample is taken with the following mass: 0.1 to 0.2 g for an estimated specific surface area of more than 30 $m^2/g$; 0.3 g for an estimated specific surface area of 10-30 $m^2/g$; 1 g for an estimated specific surface area of 3-10 $m^2/g$; 1.5 g for an estimated specific surface area of 2-3 $m^2/g$; 2 g for an estimated specific surface area of 1.5-2 $m^2/g$; 3 g for an estimated specific surface area of 1-1.5 $m^2/g$.

A 3 $cm^3$ or 9 $cm^3$ cell is used depending on the volume of the sample. The whole of the measurement cell (cell+glass rod) is weighed. Next the sample is added into the cell: the product should not be at less than one millimeter from the top of the neck of the cell. The whole (cell+glass rod+sample) is weighed. The measurement cell is set into place on a degassing station and the sample is degassed. The degassing parameters are 30 min/45° C. for Portland cement, gypsum, pozzolans; 3 h/200° C. for slags, flying ashes, aluminous cement, limestone; and 4 h/300° C. for controlled alumina. The cell is rapidly blocked with a plug after degassing. The whole is weighed and the result is noted. All the weighing operations are carried out without the plug, the latter being temporarily removed for making the measurement. The mass of the sample is obtained by subtracting the mass of the cell from the sum of the masses of the cell and of the degassed sample.

Next analysis of the sample is carried out after having set it into place on the measurement station. The analyser is the SA 3100 from Beckman Coulter. The measurement is based on the adsorption of nitrogen by the sample at a given temperature, here the liquid nitrogen temperature i.e. about −196° C. The apparatus measures the pressure of the reference cell in which the adsorbate is at its saturating vapor pressure and that of the cell of the sample into which known volumes of adsorbate are injected. The resulting curve from these measurements is the adsorption isotherm. In the measurement method, the knowledge of the dead volume of the cell is required: a measurement of this volume is therefore conducted with helium before the analysis.

The sample mass computed earlier is entered as a parameter. The BET surface area is determined by the piece of software by linear regression from the experimental curve. The reproducibility standard deviation obtained from 10 measurements on a silica with specific surface area of 21.4 $m^2/g$ is 0.07. The obtained reproducibility standard deviation from 10 measurements on a cement with specific surface area of 0.9 $m^2/g$ is 0.02. Once every two weeks, a check is carried out on a reference product. Twice a year, a check is conducted with the reference alumina provided by the manufacturer.

Determination of Particle Size

In the present description and accompanying claims, particle size is measured by laser particle size analysis, e.g. using a Malvern MS2000 laser analyser. Measurement is performed in ethanol. The light source is a red He—Ne laser (632 nm) and blue diode (466 nm). The optical model is the Mie model and the computing matrix of polydisperse type.

The apparatus is calibrated before each work session using a standard sample (C10 silica, Sibelco) with known particle size curve.

Measurement is carried out with the following parameters: pump rate 2300 rpm and stirrer speed of 800 rpm. The sample is positioned to obtain 10 to 20% obscuration.

Measurement is conducted after stabilisation of obscuration. 80% sonication is emitted for 1 minute to ensure de-agglomeration of the sample. After about 30 seconds (to evacuate any air bubbles) the sample is measured for 15 seconds (15000 images analysed). Without emptying the cell, the measurement is repeated at least twice to verify the stability of the result and evacuation of any bubbles.

All the measurements given in the description and specified ranges correspond to the mean values obtained with ultrasound.

The particle size of sand is generally determined by screening.

D90, also denoted $D_V 90$, corresponds to the $90^{th}$ percentile of the volume distribution of particle size i.e. 90% of the particles are of size less than D90 and 10 are of size greater than D90.

Similarly, D50 also denoted $D_V 50$, corresponds to the $50^{th}$ percentile of the volume distribution of particle size i.e. 50% of the particles are of size less than D50 and 50% are of size greater than D50.

Similarly, D10 also denoted $D_V 10$, corresponds to the $10^{th}$ percentile of the volume distribution of particle size i.e. 10% of the particles are of size less than D10 and 90% are of size greater than D10.

Determination of the Stress Threshold

The stress threshold is the stress value (expressed in Pascal) measured at a shear gradient of 0.1 $s^{-1}$ on the Rheolab QC rheometer provided by the Anton Paar corporation, with the simple tool of a single pitch propeller, called SHSP, during a phase for lowering the shear rate. The measurement is generally carried out at room temperature.

The hydraulic composition is positioned in a cylindrical tank with the diameter of 45 mm and a height of 120 mm. The tank is positioned in the rheometer. The SHSP tool is introduced into the tank. A first shear gradient is applied gradually from 0 to 20 $s^{-1}$ within 60 seconds, and then a second shear gradient is applied from 20 $s^{-1}$ to 0.1 $s^{-1}$ within 60 seconds. The obtained stress value is noted.

Compressive Strength Measurement Method

Irrespective of test age, compressive strength is measured on samples of hardened concrete or mortar of cylindrical shape with diameter of 7 cm and height of 14 cm, the load applied to the sample is increased at a rate of 3.85 kN/sec during the compression test.

The samples of hardened concrete or mortar were molded immediately after the concrete or mortar were prepared. The mold was attached to a vibrating table. The concrete or mortar were poured into the mold in two layers. The first layer of concrete or mortar then the second layer were placed in position under vibration until fully settled. The mold was then removed from the vibration table and levelled to remove excess concrete or mortar. The molds were closed with a lid and placed in a humid chamber at 20° C.±1° C. The mold was removed from the chamber and the hardened test piece of concrete or mortar was released from the mold at the testing age selected for the compressive strength test of up to 24 hours after mixing.

For testing ages longer than 24 hours after mixing, the test pieces were released from the mold 24 hours after mixing then replaced in the humid chamber at 20° C.±1° C. The hardened concrete or mortar test pieces were removed from the chamber before measurement of compressive strength. The test pieces of hardened concrete or mortar were wiped and covered with a moist cloth until measurement.

To measure compressive strength, an increasing load was applied to the side surfaces of the test piece of hardened concrete or mortar, at rate of 2 400 N/s±200 N/s, until rupture of the test piece.

EXAMPLES

Raw Materials

Cement No 1 was a Portland CEM I, 52.5 N CE CP2 NF cement supplied by Lafarge, Saint Pierre La Cour. This cement was prepared by pneumatic classification using a very high fineness TSV 1000 separator. The principle is to separate a starting population into 2 fractions (even 3 if ultra-fines are considered separately): one fraction formed of the coarsest particles of the starting product, called rejects, one fraction formed of the finest particles of the starting product. The rotation speed of the selector and air flow rate were set to obtain separation of the particles of desired particle size. The characteristics of the particles in the cement obtained are given in following Table 1:

TABLE 1

| | BET specific surface area in m²/g | D10 in μm | D50 in μm | D90 in μm |
|---|---|---|---|---|
| Cement No1 | 1.05 | 2.56 | 15.47 | 42.58 |
| | 1.7 | 1.73 | 8.05 | 21.97 |
| | 4.45 | 1.35 | 5.53 | 13.22 |

Cement No 2 was a Portland CEM I, 52.5 N CE PM ES NF cement supplied by Lafarge, Le Teil. This cement was prepared by pneumatic classification using a separator with opposing air jets: ALPINE 200 AFG. The principle is to separate a starting population into 2 fractions (even 3 if ultra-fines are considered separately):one fraction formed of the coarsest particles in the starting product, called rejects, and one fraction formed of the finest particles of the starting product. The rotation speed of the selector and air flow rate were set to obtain separation of the particles with the desired particle size. The characteristics of the particles in the cement obtained are summarized in following Table 2:

TABLE 2

| | BET specific surface area in m²/g | D10 in μm | D50 in μm | D90 in μm |
|---|---|---|---|---|
| Cement No2 | 1.25 | 1.92 | 7.98 | 19.08 |
| | 1.6 | 1.42 | 7.08 | 18.01 |
| | 1.85 | 1.34 | 5.25 | 10.99 |

The water used was mains water.

The mineral addition A1 was either:

metakaolin supplied by Lavollee SA and sold under the trade name MOtamax, the particles of which have a D50 of 4.4 μm; or silica fume supplied by Saint Gobain, sold under the trade name SEPR Le Pontet and, the particles of which have a D50 of 3 μm BE01 sand is a siliceous sand certified conforming to European standard NF EN 196-1 of April 2006, supplied by Sibelco and, the particles of which have a D10 comprised from 210 μm, D50 of 313 μm and a D90 of 410 μm;

The superplasticizer containing modified polycarboxlic ether was Prelom 300 by BASF the dry extract concentration of which is 15% by mass;

The mineral addition A2 was either:

siliceous filler supplied by Sibelco, sold under the trade name Millisil C6 and the particles of which have a D50 of 35 μm;

calcium carbonate supplied by Omya, sold under the trade name Durcal 1 and the particles of which have a D50 of 2.6 μm;

The anti-foaming agent was Dehydran supplied by Cognis, the dry extract concentration of which is 100%, mass percentage.

The anhydrous calcium sulfate (called anhydrite in Table 3) was obtained from Anhydrite Minérale France, sold under the trade name Anhydrite Micro A.

The viscosity-modifying agent (called VMA in Table 3) was a diutan gum: Kelcocrete by Kelco the dry extract concentration of which is 100%, mass percentage;

The latex was an aqueous dispersion of fine particles of copolymers of styrene-butadiene type, supplied by Chryso under the trade name Chryso® Cim the dry extract concentration of which is 50%, mass percentage.

Equipment positive displacement pump of eccentric screw type supplied by Power Sprays under the trade name PS9000;

Rhéolab QC rheometer, viscosimeter, sold by Anton Paar;

a kneader-mixer RAYNERI R601, which was provided by VMI with a tank of 10 liters. This kneader exerts a planetary rotary movement;

cylindrical cardboard molds with a diameter of 7 cm and a height of 14 cm;

humidity cabinet 95-100% relative hygrometry and 90° C.+/−1° C. provided by Verre Labo Mula;

a humid chamber with 95-100% relative hygrometry and 20+/−1° C.

Example 1

The hydraulic compositions of the invention (mixes 202 to 209, and mix 238, 303 and 308) were prepared and compared with a control composition (mix 309). Table 3 below describes the prepared compositions. In this Table 3, the unit is a relative part by mass with respect to the cement.

The concrete was produced following the protocol described below:
1) charging the dry materials in the drum of the Rayneri kneader-mixer;
2) from 0 to 60 seconds: initiation of slow speed kneading (15 rpm) to homogenise the premix;
3) from 1 min to 1 minute 30 s: adding the mixing water+admixture in 30 seconds, at a rotation speed of 15 rpm;
4) from 1 minute 30 s to 2 minutes 30 seconds: slow speed kneading (15 rpm);
5) from 2 minutes 30 seconds to 6 minutes: high speed kneading (45 rpm).

Stress threshold and compressive strength (CS) were measured following the above-described protocols. Table 4 below gives the results obtained.

TABLE 4

Results for stress threshold and compressive strength.

| Mix N° | Stress threshold at 0.1 s−1 in Pa (at t = 7 min) | CS at 28 days in Mpa |
|---|---|---|
| 202 | 285 | 99.6 |
| 203 | 106 | 117.6 |
| 204 | 175 | 111.2 |
| 205 | 147 | 112.4 |
| 206 | 134 | 90.8 |
| 207 | 221 | 97.3 |
| 208 | 222 | 98.2 |
| 209 | 86 | 102.5 |
| 238 | 263 | 102.3 |
| 303 | 178 | 99.1 |
| 308 | 61 | 123.8 |
| 309 | 104 | 85.5 |

The invention claimed is:

1. A hydraulic composition comprising in relative parts by mass with respect to the cement:
   100 parts of cement the particles of which have a BET specific surface area comprised from 1.20 to 5 $m^2/g$;
   32 to 42 parts of water;
   5 to 50 parts of a mineral addition A1 the particles of which have a D50 less than or equal to 6 μm and selected from silica fume, metakaolin, slag, pozzolans or mixtures thereof;
   90 to 230 parts of sand the particles of which have a D50 greater than or equal to 50 μm and a D90 less than or equal to 3 mm;
   0.0001 to 10 parts of a superplasticizer.

TABLE 3

| | | Hydraulic compositions | | | | | | | | | | | |
|---|---|---|---|---|---|---|---|---|---|---|---|---|---|
| | Mix | 309 | 303 | 208 | 202 | 203 | 204 | 205 | 206 | 207 | 209 | 238 | 308 |
| Cement | N° 1 | 100 | 100 | 100 | | | | | | | | | |
| | N° 2 | | | | 100 | 100 | 100 | 100 | 100 | 100 | 100 | 100 | 100 |
| | BET Cement (m2/g) | 1.05 | 4.45 | 1.7 | 1.6 | 1.6 | 1.6 | 1.6 | 1.6 | 1.85 | 1.6 | 1.25 | 1.25 |
| A1 | Metakaolin | 11 | 11 | 11 | 11 | 11 | 11 | 11 | 11 | 11 | 11 | 11 | 11 |
| | Silica fume | 0 | 0 | 0 | 0 | 0 | 5 | 0 | 0 | 0 | 0 | 0 | 0 |
| A2 | Siliceous: C6 | 267 | 0 | 0 | 0 | 267 | 267 | 0 | 0 | 0 | 0 | 0 | 0 |
| | Limestone: Durcal1 | 0 | 0 | 0 | 0 | 0 | 0 | 270 | 0 | 0 | 0 | 0 | 0 |
| Sand | Be01 | 109 | 109 | 109 | 109 | 109 | 137 | 109 | 109 | 109 | 109 | 109 | 185 |
| | anhydrite | 0 | 5.45 | 2.59 | 2.41 | 2.41 | 2.41 | 2.41 | 2.41 | 2.41 | 4.32 | 2.41 | 1.93 | 1.93 |
| | VMA | 0 | 0 | 0 | 0 | 0 | 0 | 0 | 0 | 0 | 0.1 | 0 | 0 |
| | WATER | 40 | 40.4 | 40.3 | 40.0 | 40.6 | 40 | 41.1 | 40.2 | 40.6 | 41.7 | 39.7 | 35.4 |
| Superplasticizer | Prelom 300 | 1.1 | 3.5 | 1.4 | 1.1 | 2 | 2 | 2.8 | 1.3 | 1.8 | 3.7 | 0.7 | 1.6 |
| Anti-foaming agent | Dehydran | 0.06 | 0.06 | 0.06 | 0.06 | 0.06 | 0.06 | 0.06 | 0.06 | 0.06 | 0.06 | 0.06 | 0.06 |

2. The hydraulic composition according to claim 1, comprising in relative parts by mass with respect to the cement:
- 100 parts of cement the particles of which have a BET specific surface area comprised from 1.20 to 1.7 m²/g;
- 38 to 42 parts of water;
- 8 to 20 parts of a mineral addition A1 the particles of which have a D50 less than or equal to 6 μm and selected from silica fume, metakaolin, slag, pozzolans or mixtures thereof;
- 90 to 180 parts of sand the particles of which have a D50 comprised from 100 μm to 400 μm and a D90 less than or equal to 800 μm;
- 0.0001 to 10 parts of a superplasticizer, the active material concentration of which is 15% by mass.

3. The hydraulic composition according to claim 1, further comprising from 0.001 to 2 parts of a viscosity-modifying agent expressed in relative parts by mass with respect to the cement.

4. The hydraulic composition according to claim 1, wherein the cement is a CEM I cement.

5. The hydraulic composition according claim 1, further comprising from 0 to 300 parts of a mineral addition A2, differing from A1, the particles of which have a D50 comprised from 1 μm to 50 μm, expressed in relative parts by mass with respect to the cement.

6. The hydraulic composition according to claim 1, further comprising from 0 to 10 parts of anhydrous calcium sulfate expressed in relative parts by mass with respect to the cement.

7. The hydraulic composition according to claim 1, further comprising mineral fibers, organic fibers or metal fibers or a mixture thereof.

8. The hydraulic composition according to claim 1, further comprising from 0 to 0.5 parts of antifoaming agent expressed in relative parts by mass with respect to the cement.

9. A method for producing a hydraulic composition according to claim 1, comprising mixing the cement, additions, sand, water and superplasticizer are mixed.

10. An object formed for the field of construction comprising the hydraulic composition according to claim 1.

11. A method for manufacturing an object for the field of construction comprising:
(i) preparing a hydraulic composition according to claim 1;
(ii) applying the composition prepared at step (i) to a support.

12. The production method according to claim 11, further comprising a mould release step (iii) after hardening of the hydraulic composition.

13. The production method according to claim 11, further comprising a step to pump the hydraulic composition after step (i).

14. The production method according to claim 11, wherein the support at step (i) is a mould, a wall, a partition or a floor.

15. The production method according to claim 11, wherein step (ii) is performed by projecting the hydraulic composition.

16. A method for manufacturing an object for the field of construction comprising:
(i) preparing a hydraulic composition according to claim 2;
(ii) applying the composition prepared at step (i) to a support, wherein step (ii) is performed by spraying the hydraulic composition.

17. A method for manufacturing an object for the field of construction comprising:
(i) preparing a hydraulic composition according to claim 3;
(ii) applying the composition prepared at step (i) to a support, characterized in that step (ii) is performed by casting or calendering the hydraulic composition.

* * * * *